US012563649B2

(12) United States Patent
Salters et al.

(10) Patent No.: US 12,563,649 B2
(45) Date of Patent: Feb. 24, 2026

(54) LIGHT OUTPUT SYSTEM AND DESIGN METHOD

(71) Applicant: KONINKLIJKE PHILIPS N.V., Eindhoven (NL)

(72) Inventors: Bart Andre Salters, Eindhoven (NL); Roelant Boudewijn Hietbrink, Utrecht (NL); Eduard Matheus Johannes Niessen, Ittervoort (NL); Peter Martens, Hedel (NL)

(73) Assignee: Koninklijke Phillips N.V., Eindhoven (NL)

( * ) Notice: Subject to any disclaimer, the term of this patent is extended or adjusted under 35 U.S.C. 154(b) by 121 days.

(21) Appl. No.: 18/288,061

(22) PCT Filed: Apr. 18, 2022

(86) PCT No.: PCT/EP2022/060200
§ 371 (c)(1),
(2) Date: Oct. 24, 2023

(87) PCT Pub. No.: WO2022/228927
PCT Pub. Date: Nov. 3, 2022

(65) Prior Publication Data
US 2024/0206030 A1 Jun. 20, 2024

(30) Foreign Application Priority Data
Apr. 30, 2021 (EP) .................................... 21171654

(51) Int. Cl.
| | |
|---|---|
| H05B 45/14 | (2020.01) |
| G06Q 10/0631 | (2023.01) |
| H05B 47/155 | (2020.01) |

(52) U.S. Cl.
CPC ....... *H05B 45/14* (2020.01); *G06Q 10/06313* (2013.01); *H05B 47/155* (2020.01)

(58) Field of Classification Search
CPC ...... H05B 45/14; H05B 47/155; H05B 45/10; H05B 45/325; H05B 47/10; H05B 47/20; G06Q 10/06313
See application file for complete search history.

(56) References Cited

U.S. PATENT DOCUMENTS

| | | | | |
|---|---|---|---|---|
| 5,451,979 A | * | 9/1995 | Levac | G09G 3/32 |
| | | | | 345/82 |
| 9,581,303 B2 | | 2/2017 | Gordin | |

(Continued)

FOREIGN PATENT DOCUMENTS

EP 2765348 A2 * 8/2014 .............. F21S 8/086

OTHER PUBLICATIONS

International Search Report and Written Opinion from PCT/EP2022/060200 mailed Jul. 19, 2022.

*Primary Examiner* — Abdullah A Riyami
*Assistant Examiner* — Syed M Kaiser

(57) ABSTRACT

The invention provides a light output system for delivering light to a region of interest, for providing at least a minimum light intensity to all of the region of interest. The system has more light sources of a particular kind than are needed to reach the minimum light intensity (to all of the region of interest), and they are operated with a duty cycle. The duty cycle ratio is reduced by a factor which is greater than the factor by which the number of light sources in increased above the minimum number, so that energy savings are obtained as well as an increased lifetime of the system.

14 Claims, 6 Drawing Sheets

(56)        References Cited

U.S. PATENT DOCUMENTS

|  |  |  |  |  |
|---|---|---|---|---|
| 9,750,114 | B2 | 8/2017 | Ashdown | |
| 10,548,197 | B2 * | 1/2020 | Dau ....................... | H05B 47/16 |
| 2003/0076057 | A1 | 4/2003 | Fleury | |
| 2010/0100795 | A1 | 4/2010 | Yuan | |
| 2014/0265874 | A1 | 9/2014 | Marquardt | |
| 2015/0119358 | A1 * | 4/2015 | Medina ................ | A61K 31/716 |
| | | | | 514/55 |
| 2023/0120794 | A1 | 4/2023 | Camras | |

* cited by examiner

LIGHT OUTPUT SYSTEM AND DESIGN METHOD

CROSS REFERENCE TO RELATED APPLICATIONS

This application is a U.S. national phase application of International Application No. PCT/EP2022/060200 filed on Apr. 18, 2022, which claims the benefit of EP Application Serial No. 21171654.3 filed on Apr. 30, 2021 and are incorporated herein by reference.

FIELD OF THE INVENTION

This invention relates to light output systems, for delivering light (visible or non-visible) to a region of interest, for example for visible illumination purposes or for surface treatment purposes such as for anti-biofouling.

BACKGROUND OF THE INVENTION

Many light output systems make use of a distributed set of light sources, to cover a larger area. Typically, the intensity is highest nearest the light sources, and drops with increasing distance from a light source. This is due to two main effects:

(i) The further away from a light source, the larger the area that is covered, hence the intensity drops. This causes a drop with a typical $1/r^2$ behavior (where r is the distance from the light source).

(ii) In many applications, the medium through which the light travels will absorb some of the light. This causes an exponential drop in intensity with distance.

The result is that the combined light distribution from set of light sources has a non-uniform light intensity over an area of interest. Optical components may be used to create a more constant intensity profile over area but it is difficult or even impractical to avoid non-uniformities.

One example of a distributed lighting system is street lighting. The combined light output distribution needs to ensure that the area of the street (and/or pavement) that is to be illuminated (i.e. the region of interest) reaches a minimum light intensity at all locations.

Another example of a distributed lighting system is an anti-fouling lighting system. Again, at all locations of an area or volume to be treated (i.e. the region of interest) a minimum intensity needs to be reached to guarantee a proper antifouling effect.

In both cases, to achieve this common aim, multiple light sources are typically distributed over a larger area. Given a certain light source power, the distance allowed between light sources can be calculated to achieve just the right (minimum) intensity between the light sources, where the combined intensity will be lowest. Positioning the light sources further away from each other will cause dark spots between them, whereas putting them closer to each other will unnecessarily increase the amount of light sources needed, and therefore increase the cost (bill of materials, as well as running costs).

One issue with light output systems for most applications is that the light sources have a limited lifetime (typically around 10,000 hours, both for UV LEDs as well as visible LEDs; and also for fluorescent lighting). A longer lifetime of the light output system is desirable, for example for light output systems used in infrastructure with long lifetimes, such as roads, tunnels, shipping etc.

One option to increase the lifetime is to provide more light sources than are needed to provide the desired lighting performance, for example to use one set of light sources for their lifetime and then switch (remotely) to another set of light sources for a further lifetime. This will reduce servicing and replacement costs, but it increases the initial installation cost. Furthermore, there are no benefits in the running costs.

EP 2 765 348 discloses a lighting method in which different LEDs make use of different illumination angles and radiation angles, to illuminate different areas of a road, to provide uniform overall illumination.

U.S. Pat. No. 5,451,979 discloses a LED display sign in which a duty cycle is controlled depending on how may LEDs are energized, so as not to overload a power supply.

SUMMARY OF THE INVENTION

The invention is defined by the claims.

According to examples in accordance with an aspect of the invention, there is provided a light output system for delivering light to a region of interest, for providing at least a minimum light intensity to all of the region of interest, comprising:

a first number of light sources each delivering a respective operational light output flux, wherein a smaller second number of said light sources, when operated at said operational light output flux and at 100% duty cycle, would be sufficient to provide said minimum light intensity to all of the region of interest, and the first number is a multiple $\alpha$ of the second number; and a controller for operating each one of the first number of light sources with a duty cycle, during a light output period, thereby to reduce the lowest light intensity provided within the region of interest towards the minimum light intensity, wherein the duty cycle ratio $\beta$ is less than $1/\alpha$.

The term "light" is used to refer generally to electromagnetic radiation and is not intended to be limited to visible light. The invention is of primary interest for visible light output systems and for UV light output systems as will be clear from the examples below, but the principles of the invention may be applied to any wavelength within the electromagnetic spectrum.

The term "during a light output period" is intended to mean that all of the light sources are used within a time period that may be considered to be a single illumination cycle. For example, a duty cycle for outside lighting which involves turning on at night and off during the day is not a duty cycle "during a light output period" in the context of this application, since the illumination is then continuous during the light output period. The duty cycle period is thus sufficiently short that the lighting effect is averaged over the duty cycle, and the light effect is the same for a given total light flux delivered during the duty cycle period. Thus, one light output period comprises multiple duty cycles, and each duty cycle is sufficiently short that only the average light intensity over the duty cycle is relevant to the lighting effect being provided. For visible lighting for example, a duty cycle period of less than around 10 ms will provide illumination that is perceived as continuous, and the "lighting effect" is then lighting perceived by the eye as continuous.

The term "operational light output flux" is intended to refer to the light output flux when the light source is operated permanently turned on at the intended power level. Thus, it is the light output capacity of the light source. Thus, when operated at a duty cycle, the instantaneous light output flux is the same, but the light output flux averaged over time is reduced by the duty cycle ratio (i.e. the ratio between the on-time and off-time of the duty cycle waveform).

The invention makes use of more light sources than are needed to provide the minimum light intensity by a ratio $\alpha$ (which does not need to be an integer). By operating them with a duty cycle, the lifetime of each light source is increased. This reduces the cost of replacement and maintenance. However, rather than simply increasing the number of light sources and reducing the duty cycle ratio in proportion (e.g. doubling the number of light sources and having a duty cycle ratio of 50%), the duty cycle ratio is reduced further, and preferably much further. This reduces the running costs since energy consumption is reduced, thereby compensating for the initial additional cost of the light sources. If the initial cost, energy cost and servicing and replacement costs are all taken into account, the invention provides significant long term cost savings.

Note that the second number of said light sources relates to a notional (imaginary) lighting system, for example with a number of light sources (of the same type as the first number of light sources) which can achieve the required minimum light intensity. This notional lighting system may have the minimum number of those particular light sources than can achieve the minimum light intensity. For example, the second number of light sources can be assumed to be distributed in the a way to achieve the minimum light intensity over the region of interest with a minimum number of light sources, and hence the lowest initial investment.

The invention is based on the recognition that by increasing the number of light sources, and using them all to provide a light output (rather than using one set then another set), a more uniform overall light distribution is obtained. This is particularly pronounced in some lighting applications where there is significant light attenuation between the light sources, such as under water or when using light guides to distribute the light output (for example made of glass, silicones or transparent plastics). This means the duty cycle can reduce the light intensity much more than simply in proportion with the increase in number of light sources. In particular, the duty cycle ratio can be reduced much further before the minimum light intensity is approached at any point within the region of interest.

The lifetime of the light output system roughly increases in proportion with $1/\beta$, but also depending on the type of light source. For example, for a duty cycle ratio of $\beta=0.1$ (10%) the lifetime can be extended approximately by a factor of 10. The power consumption (even taking into account the increased number of light sources which are all operating to provide illumination during any given duty cycle period) is also reduced, based on a multiple by a value $\alpha\beta$. This multiple $\alpha\beta$ has a value less than 1 since $\beta<1/\alpha$. Thus, power savings are obtained as well as increased lifetime (and hence servicing costs are reduced).

The light intensity may be expressed as the light flux per unit area. The light may be delivered to a 3D volume, and the region of interest may be a surface within that 3D volume. However, the "light intensity" may instead be considered to be an energy density, in examples where the light is to illuminate a volume.

The light sources (the first number) are all operated at the same time. This does not mean they need to be turned on at the same time, however. They may be turned on for different portions of the general duty cycle period. They may not all have the same light output flux, and there may be different light sources of different types. If the light output system has different types of light source, it remains the case that the minimum light intensity could be achieved by omitting one or more of those light sources and rearranging the remaining lamps in a different pattern over the area of interest.

The first number of light sources are preferably distributed across an area or throughout a volume, such that the lowest light intensity within the region of interest arises at one or more locations corresponding to a space between light sources.

In such a distributed system, each individual light source aims to provide light locally to a local region corresponding to its own location (i.e. a portion of the region of interest) and also to the space between that local region and local regions corresponding to the neighboring light sources. Thus, rather than the light source outputs combining to deliver light to a generally overlapping shared region of interest, each light source is responsible for providing light to a respective portion of the region of interest. The light intensity pattern reaching the region of interest then has areas of lowest intensity between those local regions, and these are the areas where it is desired to ensure the minimum light intensity is reached.

Each light source is then for providing a light output to an intended portion of the region of interest, and one portion of the region of interest only overlaps with portions of the region of interest for neighboring light sources of the distributed light output system.

The light output system for example comprises an industrial light output system. This means the light output characteristics are designed for a particular setting and the design for example aims to minimize installation cost and running costs taking into account the specific light distribution characteristics of the intended setting. Industrial lighting may for example comprise large area lighting systems (roads, car parks, stadia etc.) or specialized non-visible light delivery systems (e.g. for anti-biofouling or sterilization).

The duty cycle ratio is for example less than $1/2\alpha$ or less than $1/5\alpha$ or less than $1/10\alpha$.

The average power level may thus be much lower, for example even an order of magnitude lower, than in a system with fewer light sources, even though more light sources are being operated. This power saving arises as a result of the increased uniformity of the generated light (because the increased number of light sources are closer together) so that the minimum light intensity is easier to achieve.

The multiple $\alpha$ is for example in the range 1.1 to 2.

The duty cycle ratio $\beta$ is for example less than 0.5, for example less than 0.2, for example less than 0.1, for example less than 0.05.

A modest increase in the number of light sources represented by the value a can enable a large reduction in duty cycle ratio $\beta$ and corresponding energy savings.

In one set of examples, the light output system is for delivering anti biofouling light to a surface of interest submerged in water. The light sources may for example be embedded in a light guide panel such as a silicone panel.

The exponential absorption of light in the light guide material or when travelling through water means that increasing the number of light sources rapidly reduces the output power needed to achieve the minimum light intensity. Thus, a small additional outlay in additional light sources enables huge energy savings and increases in system lifetime.

The duty cycle period in this case is for example in the range of 1 second to 1 week, for example 1 minute to 2 days.

For anti-biofouling light, the duty cycle period, over which the light output is averaged without affecting the purpose of the illumination, can be very long.

In another set of examples, the light output system is for providing visible lighting to an area of interest.

By increasing the number of light sources to illuminate an area, and simultaneously reducing the duty cycle of each of them, the lifetime of the light output system is increased, for example even to the same lifetime as the installation of which it forms a part (a building, tunnel, street light infrastructure etc.). In this way, servicing costs are reduced. This will be particularly significant if infrastructure needs to be taken off line for such servicing, e.g. roads or tunnels or bridges.

The light output system for example is a street light output system.

The duty cycle period may then be below 10 ms hence with a frequency greater than 100 Hz. It may be below 2.5 ms, hence with a frequency above 400 Hz.

For visible lighting, the duty cycle period, over which the light output is averaged without affecting the purpose of the illumination, has to be sufficiently short not to be perceivable as flashing to the human eye.

The invention also provides a method of delivering light to a region of interest, for providing at least a minimum light intensity to all of the region of interest, comprising:

operating a first number of light sources, each delivering a respective operational light output flux, wherein a smaller second number of said light sources when operated at said operational light output flux and at 100% duty cycle would be sufficient to provide said minimum light intensity to all of the region of interest, and the first number is a multiple $\alpha$ of the second number, wherein the method comprises operating each one of the first number of light sources with a duty cycle during a light output period, thereby to reduce the lowest light intensity provided within the region of interest towards the minimum light intensity, wherein the duty cycle ratio $\beta$ is less than $1/\alpha$.

This provides a method of operating the light output system as defined above.

The invention also provides a computer-implemented method of designing a light output system for providing light to a region of interest, comprising:

setting a minimum light intensity to reach all of the region of interest;

for light sources delivering an operational light output flux, determining a minimum number of said light sources when operated at said operational light output flux and at 100% duty cycle which would be sufficient to provide said minimum light intensity to all of the region of interest, selecting a first number of light sources, each delivering said respective operational light output flux, wherein the first number is a multiple $\alpha$ greater than 1 of the minimum number; and selecting a duty cycle for the operation of said first number of light sources, thereby to reduce the lowest light intensity provided within the region of interest towards the minimum light intensity, wherein the duty cycle ratio $\beta$ is less than $1/\alpha$.

This method involves the selection of the most suitable number of light sources for a particular installation (equivalent to setting the spacing between the light sources) and setting the duty cycle, such that energy savings are obtained as well as extended system lifetime.

The method may comprise setting a target lifetime for the light output system, wherein selecting the first number of light sources and the duty cycle takes account of the target lifetime.

In this way, servicing costs can be reduced in that the lifetime of the light output system reaches or exceeds a target lifetime, which is for example a lifetime of an infrastructure of which the light output system forms a part.

The method may comprise determining an installation cost for the light output system, an energy cost for running the light output system and a servicing cost for servicing the light output system over the target lifetime, wherein selecting the first number of light sources and the duty cycle takes account of the installation, energy and servicing costs.

The total cost of the light output system during its intended lifetime can thus be taken into account. The first number of light sources and the duty cycle are for example chosen to optimize a total cost. This optimized total cost may simply be the total cost, but it may also take account of the timings at which costs arise or other cost factors.

The invention also provides a computer program comprising computer program code means which is adapted, when said program is run on a computer, to implement the method defined above.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figures 1, 2:
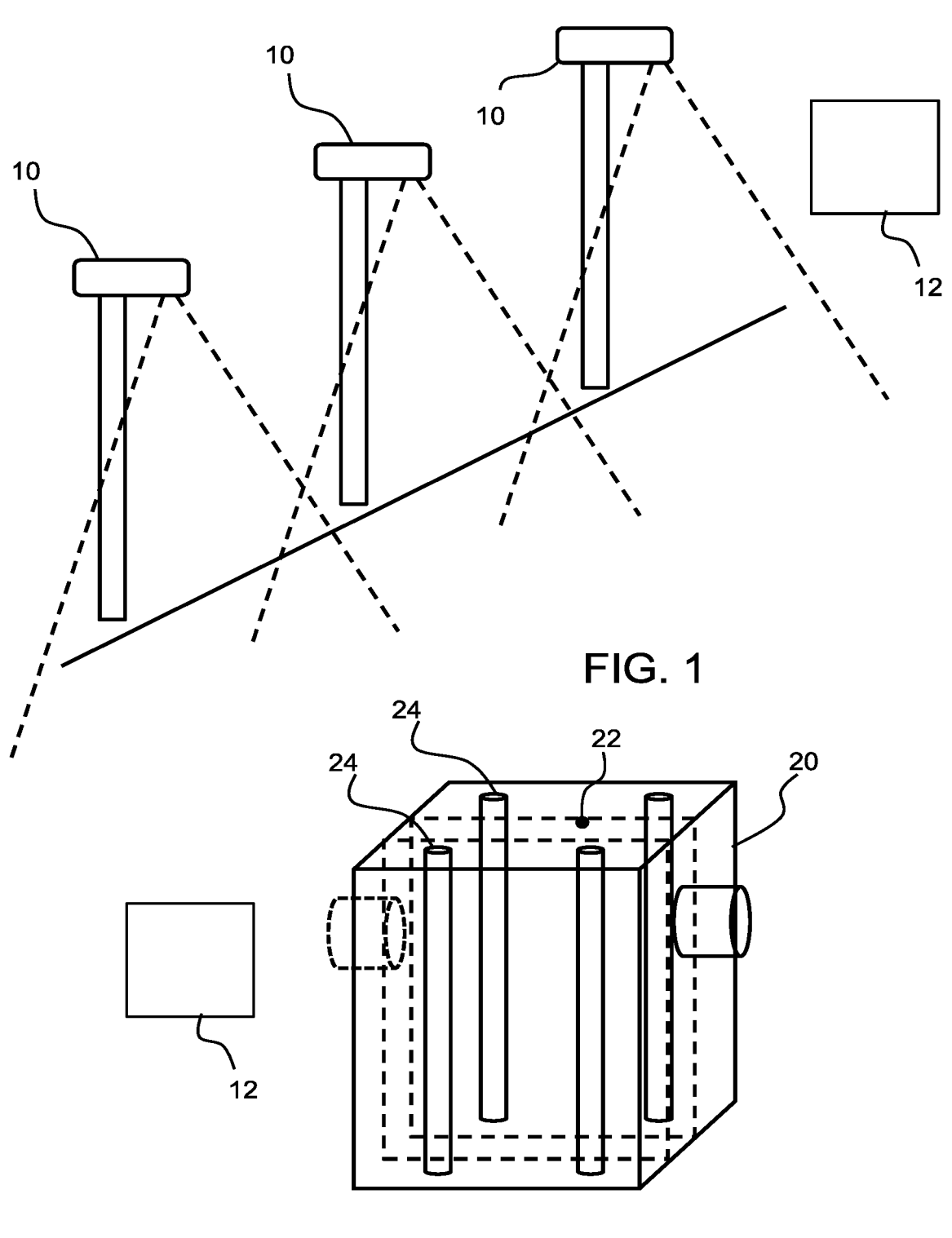
FIG. 1 shows a light output system comprising a set of street lamps.
FIG. 2 shows a cooling system for submerging in sea water with anti-biofouling light sources.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the figures are merely schematic and are not drawn to scale. It should also be understood that the same reference numerals are used throughout the figures to indicate the same or similar parts.

The invention provides a light output system for delivering light to a region of interest, for providing at least a minimum light intensity to all of the region of interest. The system has more light sources of a particular kind than are needed to reach the minimum light intensity (to all of the region of interest), and they are operated with a duty cycle. The duty cycle ratio is reduced by an amount which is greater than would correspond to the amount by which the number of light sources is increased above the minimum number, so that energy savings are obtained as well as an increased lifetime of the system.

FIG. 1 shows a light output system comprising a set of street lamps 10. They each deliver a light output flux such that a desired intensity distribution results for illuminating the road or pavement surface below. An area of road or pavement is a region of interest and the light output system is for providing a light output flux such that there is at least a minimum light intensity at all of the region of interest.

FIG. 2 shows a cooling system 20 for submerging in sea water. The cooling system comprises a heat exchanger 22, for example a set of fins, which provide a large surface area to the sea water for cooling a liquid which is pumped through the heat exchanger. Anti-biofouling light sources 24, such as UV LEDs, are provided for preventing biofouling of the heat exchanger, which would reduce its heat transfer efficiency.

FIGS. 1 and 2 each show a controller 12 for controlling the operation of the light sources.

Another example use of anti-biofouling lighting is in the form of UV lighting panels applied to the hull of a ship. By preventing biofouling of the surface of the hull, drag is reduced and hence fuel savings are made.

The invention thus may be applied to different types of light. The term "light" is used to refer generally to electromagnetic radiation and is not intended to be limited to visible light. The invention is of primary interest for visible light output system and for UV light output systems such as in the examples above, but the principles of the invention may be applied to any wavelength within the electromagnetic spectrum.

Figures 3, 4:
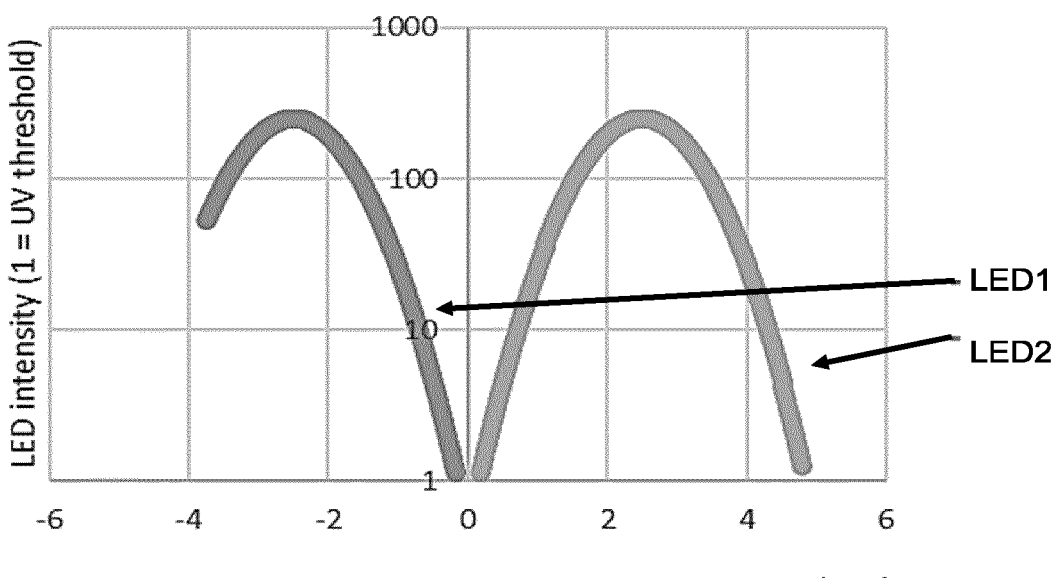
FIG. 3 shows an example of a light output distribution for two light sources spaced apart side by side.
FIG. 4 shows an example of a light output distribution in order to explain the approach of the invention.

FIG. 3 shows a light output distribution for two light sources, LED1 and LED2 spaced apart side by side. This assumes quite a strong absorption (to show the effect clearly). This for example represents the light intensity resulting from the light output flux delivered by a street lighting system to the road surface along a line when there is fog creating said strong absorption. It may similarly represent the light intensity resulting from the light output flux delivered by UV LEDs along a line.

The y-axis shows the intensity, with a logarithmic scale. Because of absorption (which depends on the medium through which the light has to travel to reach the region of interest) as well as the drop in intensity with 1/r (for a line), the intensity drops significantly between the light sources.

In a typical design procedure, the light sources are placed sufficiently closely together that the minimum light intensity reaches a threshold (which is normalized as value 1 in FIG. 3). In this way, a minimum number of light sources is used, hence minimizing the initial hardware cost. Thus, given a light source with a fixed (maximum) output, such as 1 mW UVC LED or a 35 W UVC gas discharge lamp or a 100 W visible LED street lamp, the ideal pitch can be calculated. Too large a pitch will leave dark spots which do not reach the minimum intensity threshold and too small a pitch will result in a waste of power and increased cost.

Thus, the ideal solution is typically considered to correspond to a pitch that will reach the minimum required intensity at the darkest point in the region of interest, for a given light source. The light sources are operated permanently on during an illumination period (e.g. during the night for street lighting).

An alternative approach is to select from different possible light sources. For example, light sources may be used that have a higher or lower power, to match the requirements dictated by a certain pitch. An infrastructure with a small pitch will allow the use of low power light sources, whereas an infrastructure with a large pitch will require a smaller amount of higher power sources. The optimum choice of lamp and pitch will depend on the price of the lamps, and the electricity costs.

For a given range of pitches, a small improvement in cost may obtained by suitable selection of the light source power in this way. In particular, for a certain pitch and light source power, the minimum light intensity delivered will corresponds to the required minimum light intensity hence wasting no power in delivering more than needed.

Another important issue for the design of a light output system is the desired lifetime of the solution. For many applications, the infrastructure of which the light output system is to form a part has a lifetime which far exceeds the lifetime of the light sources. For example, for road lighting, the road lighting infrastructure is expected to remain in place for many years (e.g. 25 years), far exceeding the lifetime of the light sources (e.g. 2 years). This leads to inevitable replacements of the sources, at a substantial cost. This may be particularly significant if the function of the infrastructure itself has to be interrupted during the replacement, as may be the case for a bridge or tunnel.

Thus, the cost of servicing or replacement should also be taken into account when designing a lighting system.

One known approach for extending the lifetime of the light sources, for example to match the lifetime of the infrastructure, is to provide redundancy, and hence include a multitude of light sources from the beginning. Different sets of light sources may then be turned on in succession. Each set will be able to perform the desired function (e.g. illuminate a road, or prevent biofouling of a surface), and after one set has reached its design lifetime, the next set can take over.

This is obviously a costly approach.

FIG. 4 is used to explain the approach of the invention. It assumes the same light sources as represented in FIG. 3.

FIG. 4 shows the light output intensity resulting from light output flux from three light sources, LED1, LED2 and LED3. This is a first number of light sources. Each light source delivers a respective operational light output flux, i.e. has a particular power. This "operational light output flux" is the light output when the light source is turned on continuously at its intended operating power (i.e. current and voltage).

This first number of light sources (three in this example) is greater than the minimum number needed (two in this example, as shown in FIG. 3). Thus, FIG. 3 shows a smaller second number of said light sources. This smaller second number of light sources, when operated at the operational light output flux (i.e. turned on continuously at the intended operating power), is sufficient to provide the minimum light intensity to all of the region of interest, as explained above.

Thus, the approach of FIG. 4 basically uses more light sources than are needed to reach the desired minimum light intensity over the full region of interest. In particular, the first number is a multiple $\alpha$ of the second number. In this simplified example $\alpha=1.5$.

FIG. 4 shows the sum (labeled "sum" in the figure) of the light output intensities resulting from the light output flux delivered by the three light sources. The closer spacing means that the ripple in the light output intensity has flattened significantly, and the minimum light intensity that is delivered far exceeds the required minimum (ignoring the edges which can be assumed to be outside the region of interest).

The single extra light source has resulted in the minimum light output intensity being increased by a factor of 100 (except for the boundary effect at values of x over around 3.75, or smaller than around −3.75).

This means that each one of the first number of light sources (the three light sources of FIG. 4) can now be operated with a duty cycle thereby to reduce the lowest light intensity resulting within the region of interest towards (or even to) the minimum light intensity. This duty cycle is applied at a frequency such that the light output effect may be considered to be continuous. Thus, the duty cycle periods may be considered to be "during a light output period" rather than defining separate functional light output periods and non-light output periods. Thus, all of the light sources are used within a time period that may be considered to be a single illumination cycle.

The duty cycle period is thus sufficiently short that when the lighting effect is averaged over the duty cycle the intended light output effect is not altered by this averaging process. Thus, one light output period (e.g. 12 hours as one example for the case of street lighting) comprises multiple duty cycles, and each duty cycle is sufficiently short that only the average light intensity over the duty cycle is relevant to the lighting effect being provided. For anti-fouling light, there is typically one continuous light output period.

For the example of anti-biofouling light, the effect of the light output may be the same for 1 minute of illumination followed by 9 minutes off (a duty cycle period of 10 minutes), as for 1 hour of illumination followed by 9 hours off (a duty cycle period of 10 hours), because the microbial growth is sufficiently slow that these give the same effect. More generally, the duty cycle period for anti-biofouling light is for example in the range 1 second to 1 week, such as 1 minute to 2 days.

For the example of visible lighting, the light output effect is the same as long as the human brain averages the light without perceiving flicker. The duty cycle period is for example then less than 10 ms.

The duty cycle control is implemented by a controller such as the controller 12 of FIGS. 1 and 2. The duty cycle ratio $\beta$ is less than $1/\alpha$. The duty cycle operation means the lifetime of each light source is increased (since it correlates with the on-time). This reduces the cost of replacement and maintenance as explained above. Because the duty cycle ratio is reduced further relative to the increase in the number of light sources, the running costs are reduced. The electricity running costs correlate with $\alpha\beta$, and $\alpha\beta<1$ (where 1 is the default, i.e. the running cost for the arrangement of FIG. 3).

A typical lifetime of e.g. 10,000 hours will now only be reached after 100 times that value i.e. 1,000,000 hours.

This because the switching of an LED on and off does not significantly influence the lifetime. For UVC gas discharge lamps this is not completely true, but still the same principle applies. Thus, with the addition of extra light sources, and simultaneously running those sources at a greatly reduced duty-cycle, a surprising massive reduction in power consumption is achieved, while simultaneously also greatly increasing the lifetime.

The invention is thus based on the recognition that by increasing the number of light sources (i.e. placing them closer together), and using them all (at the same time i.e. with overlapping duty cycle periods but not necessarily the same instantaneous on time) to provide illumination, a more uniform overall light distribution is obtained as shown in FIG. 4 and that this enables significant reduction in light output power by reducing the duty cycle ratio. If neighboring light sources use a duty cycle with opposite phase (on-off versus off-on), the ripple in intensity over time may then become even smaller.

Figure 5:
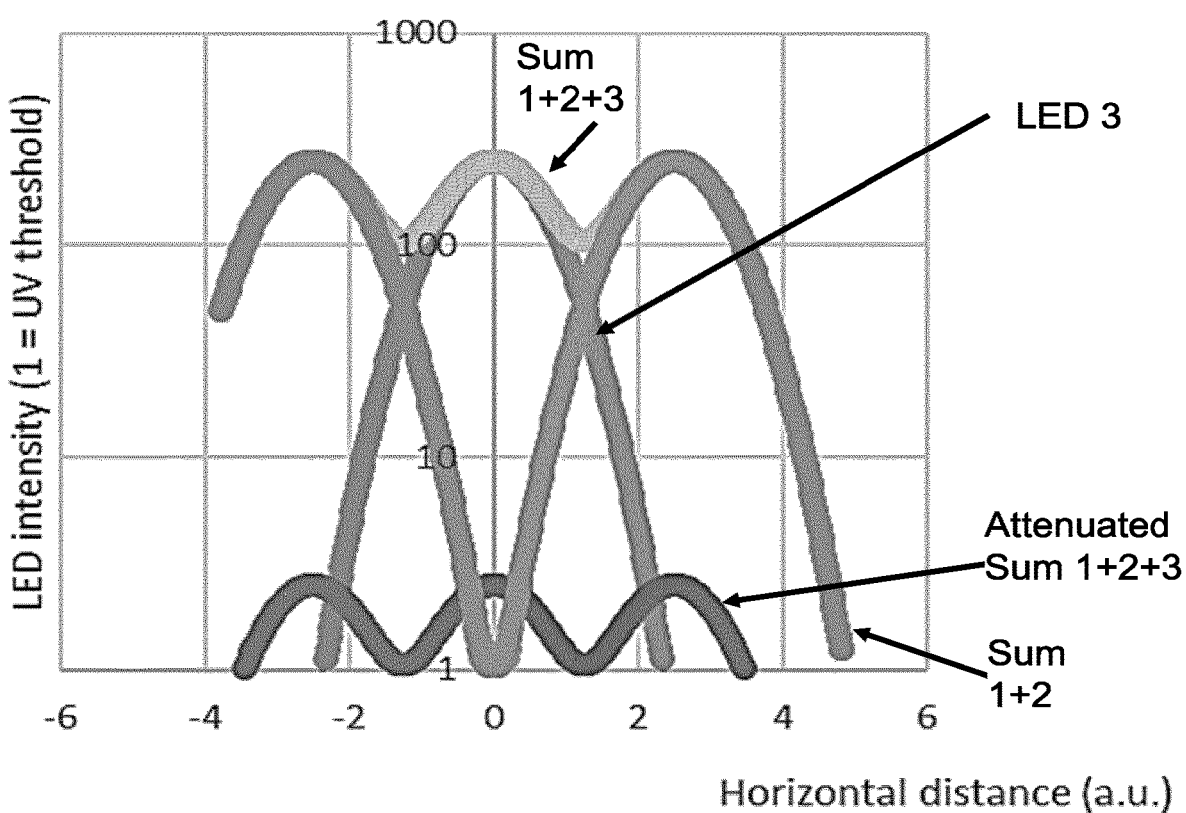
FIG. 5 shows how the combined light output intensity of FIG. 4 may be brought down in intensity by applying duty cycle control.

FIG. 5 shows how the plot "sum" of FIG. 4 may be brought down in intensity by applying duty cycle control, while still meeting the minimum light intensity. The intensity profile before duty cycle reduction is "Sum 1+2+3" and the resulting light intensity profile after duty cycle control is shown as "Attenuated Sum 1+2+3".

It can be seen that the duty cycle ratio may be much less than 0.66 (which is $1/\alpha$ since for this simplified example $\alpha=1.5$). Indeed, taking account of the logarithmic scale of FIG. 5, the peak intensity is reduced from around 300 to 3, giving a duty cycle of 0.01. Thus, the energy consumption is reduced by a factor 0.017 in this example. This represents a 60 fold decrease in energy consumption.

The actual energy savings which may be obtained will depend on the particular application. For an underwater application, the exponential decay (combined with a $1/r^2$ effect of light flux spreading over area) is such that the ripple is reduced much more dramatically. However, a road lighting system has to be designed to take account of possible foggy conditions as well, so the decay function also has to be assumed to be steep even when designing a light output system for transmission through air.

The duty cycle ratio is for example less than $1/2\alpha$ or less than $1/5\alpha$ or less than $1/10\alpha$, corresponding to energy savings of 50%, 80% or 90%. These energy savings are then balanced with the additional initial outlay of the additional light sources, in order to provide a desired economic solution.

The multiple $\alpha$ is for example in the range 1.1 to 2 and the duty cycle ratio $\beta$ is for example less than 0.5, for example less than 0.2, for example less than 0.1, for example less than 0.05.

The exact solution will depend on the particular light output system, and the medium through which light is delivered.

The simplified example above represents light intensity along a line. Of course, the invention may be applied to two dimensional areas. Not only will a single line of street lights or anti-biofouling light sources obviously illuminate a 2D area rather than a single line, other applications may use a grid of light sources, such as lighting for a parking lot or other large area, or indeed a panel of anti-biofouling light sources for providing UV light to a surface such as the surface of a ship's hull.

Figure 6:
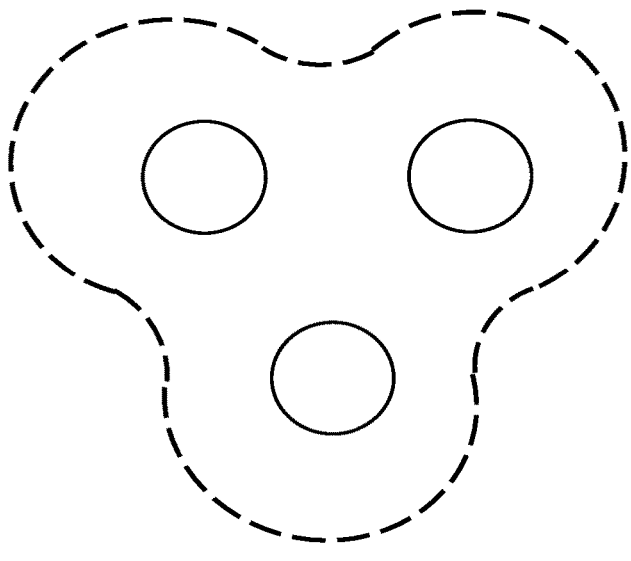
FIG. 6 shows a 2D arrangement of three light sources in an equilateral triangle arrangement.
Figure 7:
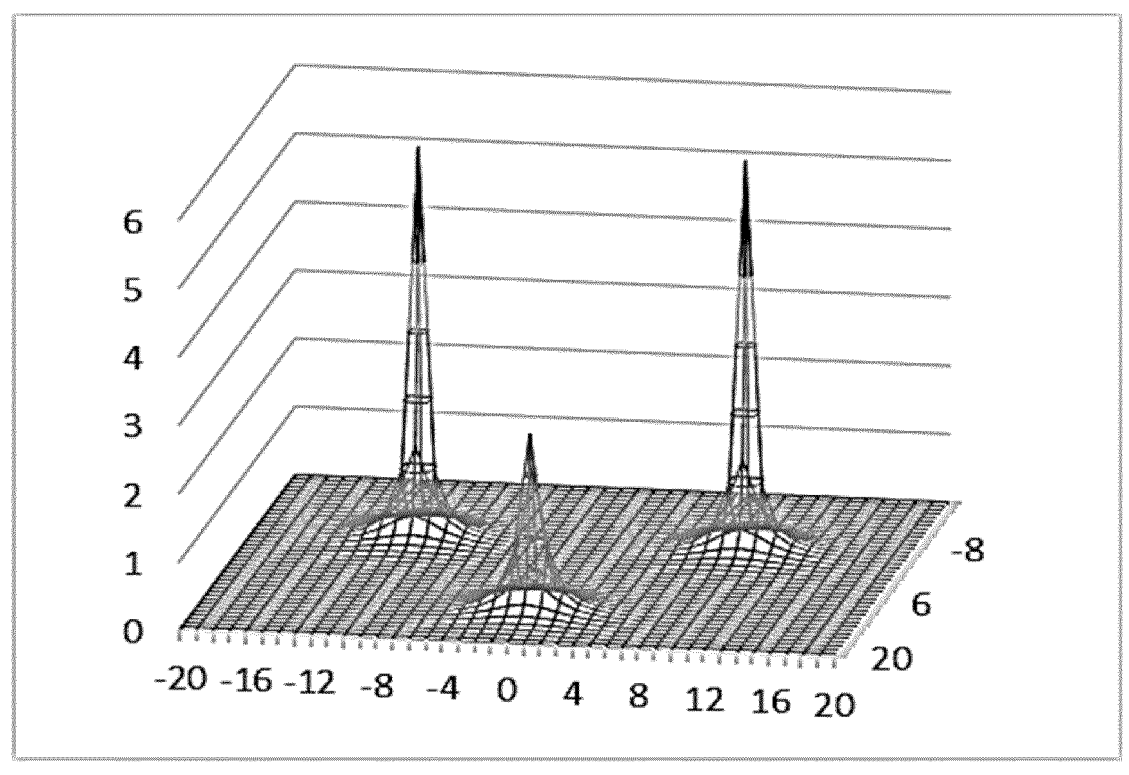
FIG. 7 shows a graph of light intensity over the 2D region of interest for the triangular arrangement of FIG. 6.

FIG. 6 shows a 2D arrangement of three light sources in an equilateral triangle arrangement and shows the outer profile of the light intensity distribution to a particular intensity level as a dotted line (hence an iso-line). The region of interest (e.g. a square parking lot) is contained within this iso-line. This assumes light sources that radiate under 360 degrees. FIG. 7 shows a graph of light intensity over the 2D region of interest.

Assuming a 2D arrangement of light sources with a pitch which can be selected as part of the design process, the cost savings of the approach of the invention compared to the standard design approaches explained above will now be explained.

The conventional design approach as explained above is that given a certain lamp power, the ideal pitch is calculated. This is the maximum distance which still achieves the minimum required intensity at the lowest intensity point, i.e. in the middle of the triangle.

Figure 8:
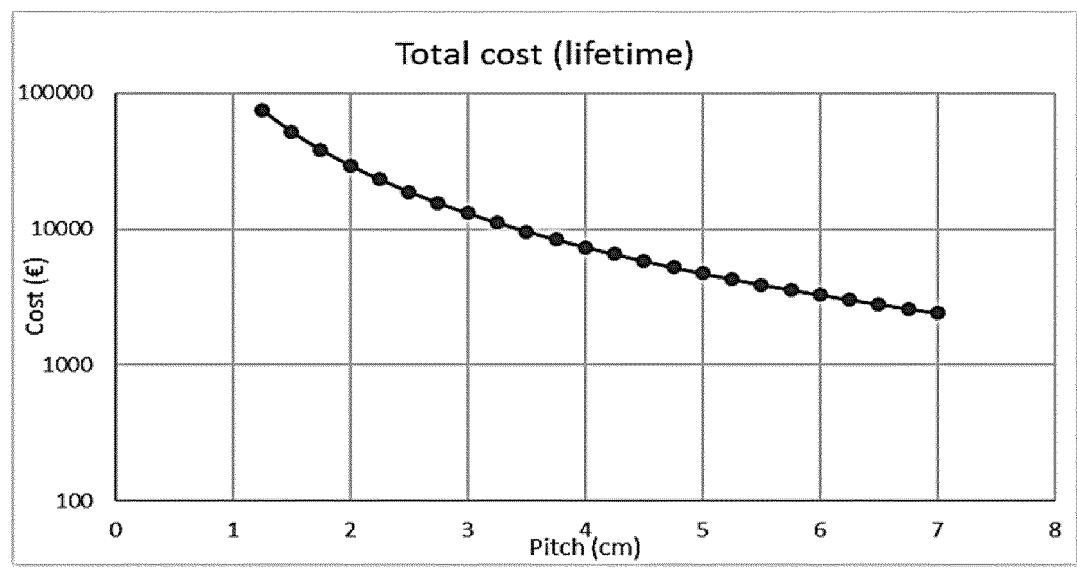
FIG. 8 shows a cost versus pitch function for a conventional design approach.

A smaller pitch could be used, but this leads to higher costs initially and higher operating costs. Thus, the conventional design approach leads to a cost versus pitch graph as shown in FIG. 8. The cost takes account of installation cost of the light sources and the electricity running costs during the time period being monitored (which is the light source lifetime in FIG. 8).

As expected, the larger the pitch, the lower the cost, as less LEDs are needed, which will thus use less electricity. Over a certain pitch (in this case 7 cm) no solution exists as this leads to a minimum intensity that does not meet the requirement.

Figure 9:
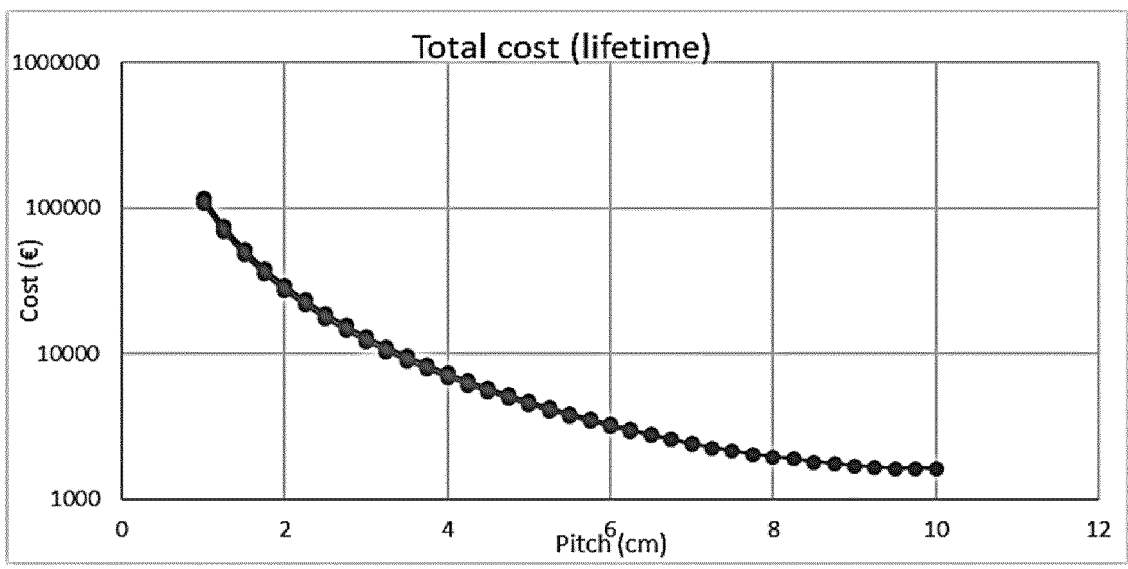
FIG. 9 shows a cost versus pitch function for an alternative known design approach.

FIG. 9 shows a cost versus pitch function for the alternative described above whereby different possible light sources may be used. Again it relates to the light source lifetime.

In FIG. 9, each point along the plot is for a different power light source, so that for each pitch, the required power light source is chosen to meet the minimum light intensity requirement.

The option of higher power light sources extends the maximum pitch from 7 cm to 10 cm. Only a small additional benefit is obtained by this approach compared to FIG. 8. In particular, for any given pitch, one light source design might give a minimum light output intensity closer to the desired minimum thus wasting less power.

These standard approaches will require replacement of the light sources after the light source lifetime (e.g. around 10,000 hours). This may be very expensive in certain situations. In situations where replacements are not an (affordable) option, the standard approach simply doesn't work; and the known solution is to use a full second set of light sources to be used consecutively.

The design approach of the invention will now be explained as well as the resulting cost benefits.

Assuming the availability of a certain LED power, the system may be designed by calculating, for every pitch value, the duty cycle at which the LED needs to run. For a pitch that is too large, a duty cycle value greater than 100% is obtained, corresponding to non-valid solutions. A duty cycle of 100% is a valid solution, corresponding to the standard design approach, but this will result in additional costs during the lifetime, due to LED replacements.

For smaller pitches, hence using more LEDs than are actually needed, a duty cycle below 100% can and will be used, such as 5%. This leads to an increase of the effective lifetime by a factor of (1/0.05)=20 in this example.

If the application lifetime is aimed at 15 years, and the sources have a lifetime of e.g. 1 year, no more LED replacements are needed.

Figure 10:
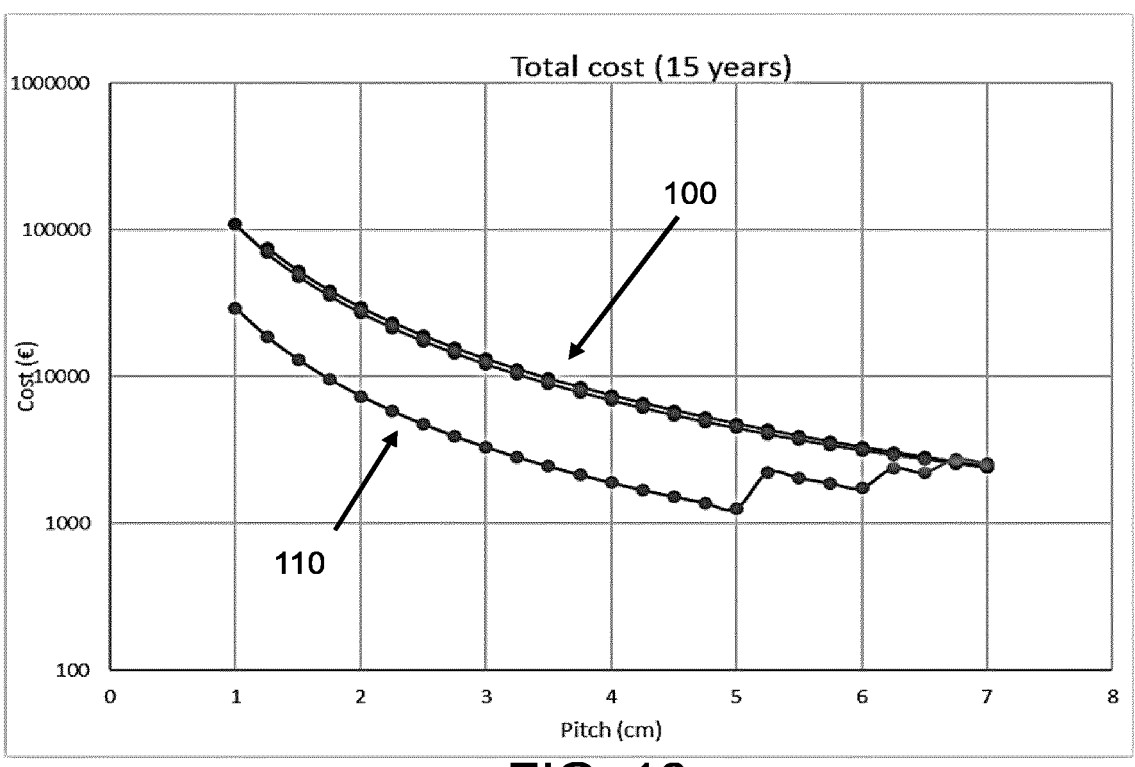
FIG. 10 shows a cost versus pitch function for the design approach of the invention.

FIG. 10 shows the cost graph, as a function of pitch.

In this case, the cost again takes account of the installation cost of the light sources and the electricity running costs during the time period being monitored (which is 15 years in FIG. 10). However, the cost now also takes account of the replacement cost for light sources, since this has now become a variable element (depending on the duty cycle), whereas in the cost analysis of FIGS. 8 and 9 the number of replacements needed is fixed regardless of pitch.

Plot 100 corresponds to FIG. 8.

Plot 110 is the cost function achieved by the new design approach.

The optimum pitch now has shifted to a smaller value (5 cm in this example) and more importantly, at a substantially reduced cost. On top of this, no light source replacement is needed anymore during the application lifetime.

Note that the discontinuities in plot 110 are caused by the fact that above a certain pitch value, LED replacements do become necessary. The step increase in cost at pitch 5 cm corresponds to a first replacement, and second and third replacements result in steps at 6 cm and 6.5 cm.

The optimum pitch value (and hence corresponding duty cycle) is now achieved at that pitch for which the LEDs can run at a sufficiently low duty-cycle ratio that they will outlive the application lifetime.

Figure 11:
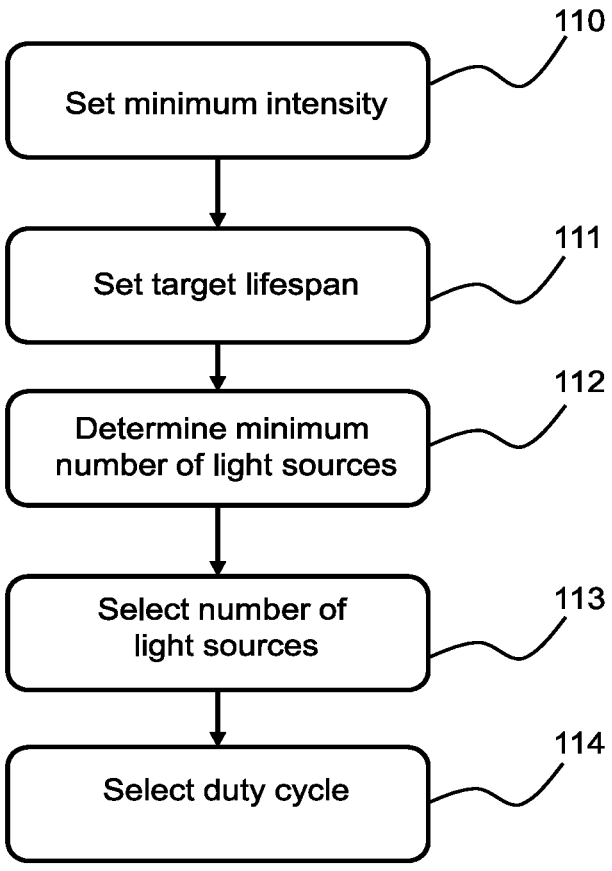
FIG. 11 shows a method of designing a light output system for providing light to a region of interest.

FIG. 11 shows a method of designing a light output system for providing light to a region of interest.

In step 110, a minimum light intensity is set to reach all of the region of interest. This minimum may be external (customer) requirements. For example, it may or may not include an additional safety margin.

In step 111, a target lifetime for the light output system is set. This may be related to the target lifetime of an installation which will include the light sources.

In step 112, for a given light source design (i.e. with a given operational light output flux i.e. power), a minimum number of the light sources is determined which is sufficient to provide the set minimum light intensity to all of the region of interest.

In step 113, a first number of light sources is selected, wherein the first number is a multiple $\alpha$ greater than 1 of the minimum number. Thus, more light sources are used than are actually needed by a factor of a. This determination of the number of light sources is equivalent to setting a light source pitch, as described above.

In step 114 a duty cycle is selected for the operation of the light sources, thereby to reduce the lowest light intensity provided within the region of interest towards the minimum light intensity. The duty cycle ratio $\beta$ is less than $1/\alpha$.

This method thus involves the selection of the most suitable number and hence pitch of light sources for a particular installation and setting the duty cycle, such that energy savings are obtained as well as extended system lifetime. Taking account of the target lifetime means that servicing and replacement costs can also be taken into account. As explained above, these may create large step cost increases.

The determination of the number of light sources and pitch may be based on an overall cost analysis, which takes account of the installation cost for the light output system, an energy cost for running the light output system and a servicing cost for servicing the light output system over the target lifetime, wherein selecting the first number of light sources and the duty cycle takes account of the installation, energy and servicing costs. The overall cost analysis may take account of inflation, expected energy costs over time, cost of borrowing etc. Thus, different system optimizations may be appropriate in different situations.

In summary, the invention relates to light output systems with a distributed set of light sources, and enables a surprising decrease in operating cost and electricity usage, as well as an increase in effective lifetime. This is based on combining a smaller pitch (than is actually necessary) with a light source that is running at a duty cycle that is below 100% and may in some solutions be substantially lower than 100%.

The approach is particularly effective when the desired application or infrastructure lifetime is longer than the lifetime of the light sources, and where replacing a light source is costly. Other applications of interest are where energy is scarce, for example when the energy source is a battery or solar power.

The invention has been described above based on the assumption that all the light sources in the system are of the same type. This is the preferred way to design a system, but the invention may be applied with different light source types as well.

The invention has also been described above based on the assumption that all the light sources in the system are operated with the same duty cycle. This does not exclude that there may be additional light sources within the light output system which are not part of the main set (i.e. the first number of light sources).

The invention may be applied to any type of light source, for visible and non-visible light.

In addition to anti-biofouling, the light output system may be used for sterilization and sanitization purposes, for example for sterilizing surfaces in air (e.g. a door handle).

The duty cycle does not need to be fixed over time. The duty cycle may be a variable parameter over the lifetime of the system. It could for example be used to compensate for wear and tear which causes a decreasing light output over time due to LEDs deteriorating, or due to dirt and smudges appearing on the light source surface. The duty cycle at t=0 could for example be 5%, slowly increasing to 10% during the lifetime. This advantage is not available with standard solutions, since the all lights are initially set to run at 100% duty cycle, hence there is no room to increase the light output.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

A computer program may be stored/distributed on a suitable medium, such as an optical storage medium or a solid-state medium supplied together with or as part of other hardware, but may also be distributed in other forms, such as via the Internet or other wired or wireless telecommunication systems. (optional)

If the term "adapted to" is used in the claims or description, it is noted the term "adapted to" is intended to be equivalent to the term "configured to".

Any reference signs in the claims should not be construed as limiting the scope.

The invention claimed is:

1. A light output system for delivering light to a region of interest, for providing at least a minimum light intensity to all of the region of interest, characterized in that the system comprises:

a first number of light sources each delivering a respective operational light output flux, wherein a second number of said light sources, less than the first number of light sources, operated at said operational light output flux and at 100% duty cycle, would be sufficient to provide said minimum light intensity to all of the region of interest, and the first number is a multiple α of the second number; and a controller for operating each one of the first number of light sources with a duty cycle during a light output period, thereby to reduce a lowest light intensity provided within the region of interest towards the minimum light intensity, wherein the duty cycle ratio β is less than 1/α.

2. The light output system of claim 1, wherein the first number of light sources are distributed across an area or throughout a volume, such that the lowest light intensity within the region of interest arises at one or more locations corresponding to a space between light sources.

3. The light output system of claim 1 comprising an industrial light output system.

4. The light output system of claim 1, wherein:

the duty cycle ratio is less than 1/2α or less than 1/5α or less than 1/10α; and/or the multiple α is in the range 1.1 to 2.

5. The light output system of claim 1, for delivering anti biofouling light to a surface of interest submerged in water.

6. The light output system of claim 5, wherein the duty cycle period is in the range of 1 second to 1 week.

7. The light output system of claim 1, for providing visible lighting to an area of interest, wherein the light output system comprises a street light output system.

8. The light output system of claim 7, wherein the duty cycle period is below 10 ms.

9. A method of delivering light to a region of interest, for providing at least a minimum light intensity to all of the region of interest, characterized in that the method comprises:

operating a first number of light sources, each delivering a respective operational light output flux, wherein a second number of said light sources, less than the first number of light sources, operated at said operational light output flux and at 100% duty cycle would be sufficient to provide said minimum light intensity to all of the region of interest, and the first number is a multiple α of the second number, wherein the method comprises operating each one of the first number of light sources with a duty cycle during a light output period, thereby to reduce a lowest light intensity provided within the region of interest towards the minimum light intensity, wherein the duty cycle ratio β is less than 1/α.

10. A computer-implemented method of designing a light output system for providing light to a region of interest, characterized in that the method comprises:

setting a minimum light intensity to reach all of the region of interest;

for light sources delivering an operational light output flux, determining a minimum number of said light sources when operated at said operational light output flux and at 100% duty cycle which would be sufficient to provide said minimum light intensity to all of the region of interest, selecting a first number of light sources, each delivering said respective operational light output flux, wherein the first number is a multiple α greater than 1 of the minimum number; and selecting a duty cycle for the operation of said first number of light sources, thereby to reduce a lowest light intensity provided within the region of interest towards the minimum light intensity, wherein the duty cycle ratio $\beta$ is less than $1/\alpha$.

11. The method of claim 10, comprising setting a target lifetime for the light output system, wherein selecting the first number of light sources and the duty cycle takes account of the target lifetime.

12. The method of claim 11, wherein the duty cycle results in the light sources having a lifetime which is equal to or exceeds the target lifetime.

13. The method of claim 11, comprising determining an installation cost for the light output system, an energy cost for running the light output system and a servicing cost for servicing the light output system over the target lifetime, wherein selecting the first number of light sources and the duty cycle is based on the installation, energy and servicing costs.

14. The method of claim 12, wherein the method comprises selecting the first number of light sources and the duty cycle to optimize a total cost.

\* \* \* \* \*